United States Patent
Cohen et al.

(10) Patent No.: US 8,220,822 B2
(45) Date of Patent: Jul. 17, 2012

(54) MULTI-SEAT STROLLER

(75) Inventors: Eric Cohen, New York, NY (US); Paul Dowd, Scarsdale, NY (US); Robert Victor, Bronxville, NY (US); Robert L. Marvin, Jr., Bronxville, NY (US); Erol Searfoss, Bronxville, NY (US)

(73) Assignee: Eric Cohen, New York, NY (US)

( * ) Notice: Subject to any disclaimer, the term of this patent is extended or adjusted under 35 U.S.C. 154(b) by 602 days.

(21) Appl. No.: 12/358,385

(22) Filed: Jan. 23, 2009

(65) Prior Publication Data

US 2010/0044984 A1 Feb. 25, 2010

Related U.S. Application Data

(60) Provisional application No. 61/189,677, filed on Aug. 21, 2008.

(51) Int. Cl.
*B62B 7/14* (2006.01)
(52) U.S. Cl. ...... 280/647; 280/658; 280/650; 280/47.38
(58) Field of Classification Search .......... 280/647, 280/657, 47.38, 38, 642, 643, 648, 650, 658
See application file for complete search history.

(56) References Cited

U.S. PATENT DOCUMENTS

| | | |
|---|---|---|
| 1,707,186 A | 5/1928 | Chatfield |
| 3,383,738 A | 5/1968 | Fox et al. |
| 4,886,289 A | 12/1989 | Yee et al. |
| D311,363 S | 10/1990 | Lin |
| 4,969,656 A | 11/1990 | Clausen |
| 5,033,761 A | 7/1991 | Kelly |
| 5,076,599 A | 12/1991 | Lockett et al. |
| 5,562,300 A | 10/1996 | Nelson |
| 5,599,033 A | 2/1997 | Kolbus et al. |
| D379,333 S | 5/1997 | Jacobs |
| 5,653,460 A | 8/1997 | Fogarty |
| 5,918,892 A | 7/1999 | Aaron et al. |
| D423,994 S | 5/2000 | Helwig |
| 6,086,087 A | 7/2000 | Yang |
| D429,476 S | 8/2000 | Gehr |
| D429,664 S | 8/2000 | Gehr |
| D430,076 S | 8/2000 | Gehr |
| D431,212 S | 9/2000 | Haung |
| 6,267,406 B1 | 7/2001 | Huang |
| 6,288,894 B1 | 9/2001 | Schmitt |
| D450,633 S | 11/2001 | Yang et al. |
| 6,378,892 B1 | 4/2002 | Hsia |
| 6,752,405 B1 | 6/2004 | Wright |
| 6,935,652 B2 | 8/2005 | Fair et al. |
| 6,938,906 B1 | 9/2005 | Black |
| 6,979,017 B2 | 12/2005 | Chen |
| 2006/0087103 A1 | 4/2006 | Schreiber et al. |
| 2007/0045972 A1 | 3/2007 | Thompson |
| 2008/0179863 A1 | 7/2008 | Schonfeld |

OTHER PUBLICATIONS

International Search Report.
Written Opinion.

*Primary Examiner* — J. Allen Shriver, II
*Assistant Examiner* — Erez Gurari
(74) *Attorney, Agent, or Firm* — Fulbright & Jaworski, LLP (57) ABSTRACT

Convertible strollers having connecting mechanisms for joining single strollers to each other.

11 Claims, 7 Drawing Sheets

MULTI-SEAT STROLLER

RELATED APPLICATIONS

The present invention claims the benefit of U.S. Provisional Application Ser. No. 61/189,677, filed Aug. 21, 2008, which is herein incorporated by reference in its entirety.

FIELD OF THE INVENTION

The present invention relates to single strollers that connect to form multi-seat strollers. More particularly, this invention relates to innovative fastening mechanisms and methods for connecting single strollers to each other to convert them into either dual or multi-seat strollers that avoid compromising the stability or size of the stroller.

BACKGROUND OF THE INVENTION

For many parents, strollers are indispensable for carrying their children, particularly in urban areas where it is more convenient to travel by foot than by car. The childcare industry has responded by propagating a number of different types of stroller to address varying needs of each parent. Generally, design efforts have focused on creating lighter, more ergonomic, yet stable strollers. While these qualities are generally desired in all strollers, the stroller industry has failed to adequately meet the needs of parents with multiple children. These parents require multiple strollers when traveling with multiple children, but also require the convenience and flexibility of a single-stroller when traveling with one child.

To help parents with multiple children, the stroller industry has developed "dual-strollers." Dual strollers are generally comprised of two child seating areas that are either horizontally or vertically aligned. The horizontally aligned dual-strollers sit the children side-by-side and next to each other. The vertically aligned dual-strollers sit the children relatively one above the other. While these types of strollers may work for carrying two children of approximately the same size, they suffer from several drawbacks. For example, the dual-strollers are generally sold as "dual-strollers"; therefore, for childcare providers who have a single child most of the time and only sometimes have a second child, the dual stroller is an expensive and wasteful solution. Moreover, when only one child is being transported, dual-strollers are awkward to push as the balancing is displaced. Another problem occurs when two adults using a dual-stroller have to travel to two different locations, each with one child. In this circumstance, the dual-stroller cannot be separated for use as it is an integrated unit designed to transport two children together.

As such, there remains a need for an improved stroller that has the benefits of both a single and multi-seat stroller that is safe, convenient, and that can be produced and sold at a reasonable cost.

SUMMARY

The present invention is directed to convertible strollers that comprise easy-to-use, yet structurally secure, connecting mechanisms for joining single strollers to each other and converting them into dual or multi-seat strollers. An objective of the present invention is to provide dual multi-seat strollers that are fully functioning and safe on a stand-alone basis—as single strollers—but that are also capable of combining to form a durable, fully functioning dual or multi-seat stroller.

In one exemplary embodiment, the present invention comprises a primary connecting mechanism applied to a stroller where the connecting mechanism comprises a rigid two-point connection. In the exemplary embodiment, the coupling mechanism is engaged by rolling one stroller up to the other. Once the two strollers are connected, they are functionally equivalent to a single dual-seat stroller. As such, the inventive stroller can be used as a single stroller but also can be converted into a dual-seat stroller, thereby allowing parents the flexibility to conveniently travel with one or more children according to their preference. Of course it will be understood by those of skill in the art that the stroller can be converted into a multi-use stroller as well by attaching more than two strollers together using the inventive connecting mechanisms disclosed herein.

In one exemplary embodiment, the inventive multi-seat stroller unit comprises a first stroller comprising a first side and a second side wherein the first side comprises a first hub having a male protruding feature and the second side comprises a second hub having a female receiving feature, and a second stroller comprising a first side and a second side wherein the first side comprises a first hub having a male protruding feature and the second side comprises a second hub having a female receiving feature. The second hub of the second stroller can be connected to the first hub of the first stroller by mating the male protruding feature of the first hub of the first stroller to the matching female receiving feature of the second hub of the second stroller thereby adjoining the first stroller to the second stroller. In a further embodiment of the present invention, the male protruding feature of the first hub of the first stroller and the female receiving feature of the second hub of the second stroller are tapered thereby establishing a tapered dovetail wedging connection when the male protruding feature of the first stroller is engaged with the female receiving feature of the second stroller.

In yet a further embodiment of the present invention, the inventive multi-seat stroller unit comprises an interlocking frame arrangement comprising a first wheel base connected to the first stroller. The first wheel base comprises an S-frame where the S-frame further comprises a proximal frame portion, a proximal support piece, a distal frame portion, a distal support piece, and an S-linking support piece. The proximal frame portion is connected to the proximal support piece at one end and connected to the distal support piece by the S-linking support piece at the other end. The said distal frame portion is connected to said distal support piece. The first wheel base further comprises a first wheel that has a hub connected to the S-frame by the proximal support piece and a second wheel that has a hub connected to the S-frame by the distal support piece. The interlocking frame arrangement in accordance with this exemplary embodiment of the present invention further comprises a second wheel base connected to the second stroller. The second wheel base also comprises an S-frame where the S-frame further comprises a proximal frame portion, a proximal support piece, a distal frame portion, a distal support piece, and an S-linking support piece. The proximal frame portion is connected to the proximal support piece at one end and connected to the distal support piece by the S-linking support piece at the other end and wherein the distal frame portion is connected to the distal support piece. The first wheel base further comprises a first wheel that has a hub connected to the S-frame by the proximal support piece and a second wheel that has a hub connected to the S-frame by the distal support piece. In this exemplary embodiment of the present invention, the second wheel of the first stroller and the first wheel of the second stroller can interlock by driving the first wheel of the second stroller to the inner side of the second wheel of the first stroller such that a portion of the distal support piece of the first stroller interfaces with a portion of the proximal support piece of the second stroller and a portion of the distal frame portion of the first stroller interfaces with a portion of the proximal frame portion of the second stroller thereby adjoining the first stroller and the second stroller.

In yet a further exemplary embodiment of the present invention, the first hub of the first stroller is disposed in a center and rear location of the first side of the first stroller and the second hub of the first stroller is disposed in a center and rear location of the second side of the first stroller. In another exemplary embodiment of the present invention the first hub of the second stroller is disposed in a center and rear location of the first side of the second stroller and the second hub of the second stroller is disposed in a center and rear location of the second side of the second stroller.

In yet an alternate exemplary embodiment of the present invention, the first stroller comprises a seat comprising a back-support portion and seat-support portion. The first hub of the first stroller is disposed behind and towards a bottom of the back-support portion and above and behind the seat-support portion of the first side of the stroller. The second hub is disposed behind and towards a bottom of the back-support portion and above and behind the seat-support portion of the second side of the first stroller. In yet a further exemplary embodiment of the present invention, the second stroller comprises a seat comprising a back-support portion and a seat-support portion. The first hub of the second stroller is disposed behind and towards a bottom of the back-support portion and above and behind the seat-support portion of the first side of the second stroller. The second hub is disposed behind and towards a bottom of the back-support portion and above and behind the seat-support portion of the second side of the second stroller.

In another exemplary embodiment of the present invention, the first stroller comprises a seat comprising a back-support portion and a seat-support portion. The first hub of the first stroller is disposed underneath and toward the rear of the seat-support portion of the first side of the first stroller. The second hub is disposed underneath and toward the rear of the seat-support portion of the second side of the first stroller. In yet another embodiment of the present invention, the second stroller comprises a seat comprising a back-support portion and a seat-support portion and the first hub of the second stroller is disposed underneath and toward the rear of the seat-support portion of the first side of the second stroller. The second hub is disposed underneath and toward the rear of the seat-support portion of the second side of the second stroller.

In an alternate embodiment of the present invention, the first hub and second hub of said first stroller are releasably connected to the first stroller and the first hub and second hub of the second stroller are releasably connected to the second stroller.

In yet another exemplary embodiment of the present invention, the multi-seat stroller unit further comprises a secondary connecting mechanism disposed towards the top of the multi-seat stroller unit. The secondary connecting mechanism of this exemplary embodiment comprises a first pin connected to an upper frame of the first side of the first stroller and a first socket connected to an upper frame of the second side of the first stroller. The secondary connecting mechanism of this exemplary embodiment further comprises a second pin connected to an upper frame of the first side of the second stroller approximately parallel to the first socket on the first stroller and a second socket connected to an upper frame of the second side of the second stroller approximately parallel to the first pin on the first stroller. The second socket can be connected to the first pin on the first stroller by injecting the first pin of the first stroller into the second socket of the second stroller thereby adjoining the first stroller to the second stroller.

In an alternate exemplary embodiment of the present invention the first pin and first socket of the first stroller are releasably connected to the first stroller and the second pin and the second socket of the second stroller are releasably connected to the second stroller.

In a further embodiment of the present invention, a stroller capable of being connected to another stroller comprises a first side that has a first hub with a male protruding feature. The first hub can be connected to a matching hub having a female receiving feature on another stroller. The stroller further comprises a second side that has a second hub with a female receiving feature. The second hub can be connected to a matching hub having a male protruding feature on another stroller.

In an alternate exemplary embodiment of the present invention, a stroller capable of being connected to another stroller comprises an interlocking wheel base. The interlocking wheel base in accordance with an exemplary embodiment of the present invention comprises an S-frame. The S-frame comprises a proximal frame portion, a proximal support piece, a distal frame portion, a distal support piece, and an S-linking support piece. The proximal frame portion is connected to the proximal support piece at one end and connected to the distal support piece by the S-linking support piece at the other end. The distal frame portion is connected to the distal support piece. The interlocking wheel base further comprises first wheel with a hub connected to the S-frame by the proximal support piece and a second wheel with a hub connected to the S-frame by the distal support piece.

These and other features of the present invention are further explained with reference to the following description and appended claims.

DESCRIPTION

With reference to the figures, exemplary embodiments of the invention are now described. These embodiments illustrate principles of the invention and should not be construed as limiting the scope of the invention.

Figure 1:
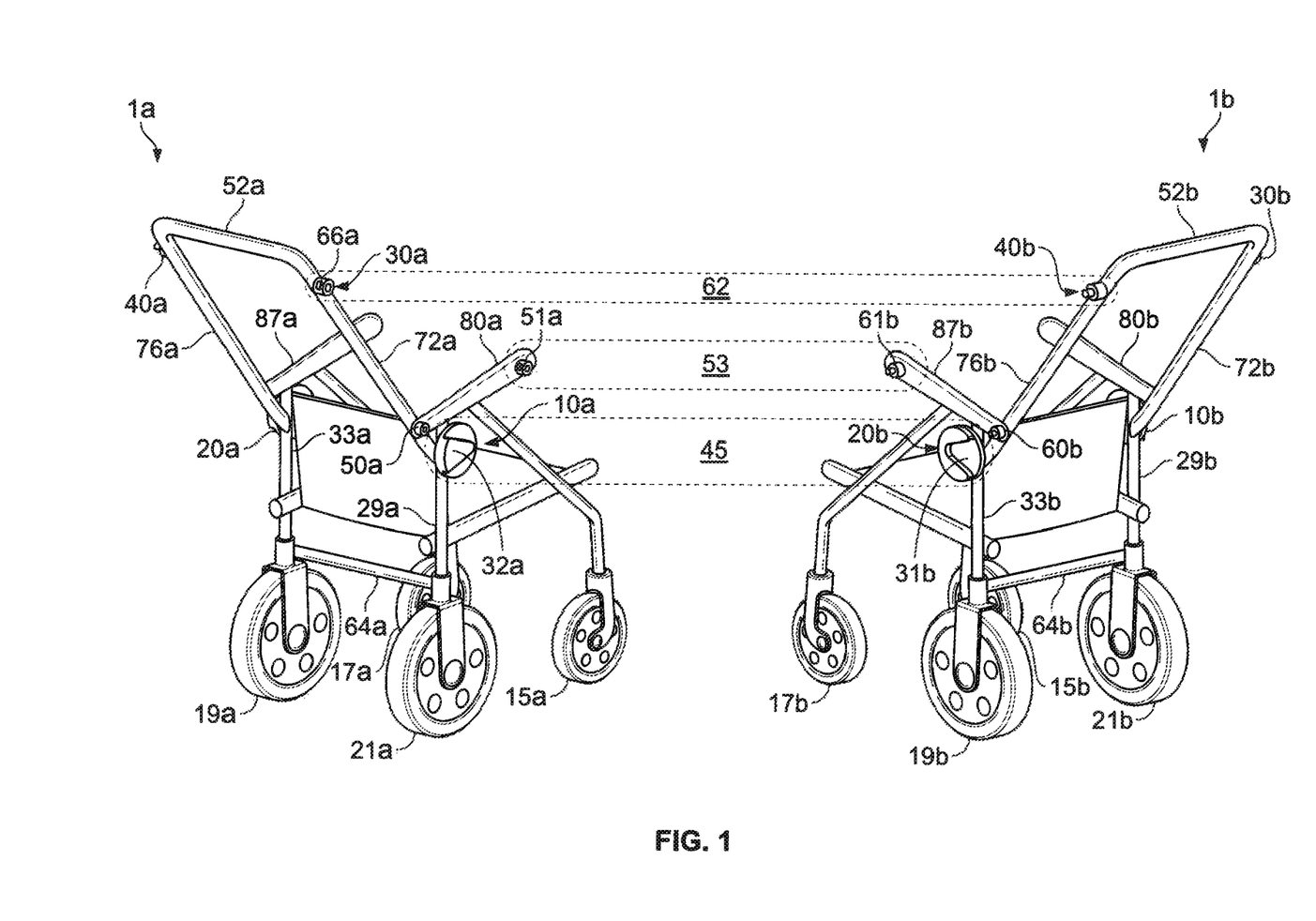
FIG. 1 is an illustrative view of two inventive strollers in accordance with an exemplary embodiment of the present invention where one of the strollers is positioned to show its right-side and one of the strollers is positioned to show its left-side.

FIG. 1 is an illustrative view of two inventive strollers 1a and 1b in accordance with exemplary embodiments of the present invention where one of the strollers 1a is positioned to show its right-side and one of the strollers 1b is positioned to show its left-side prior to being joined. As shown, in this exemplary embodiment, each stroller 1a or 1b comprises a primary connecting mechanism 45 that is comprised of hubs 10a and 10b on the right side of the strollers that mate with corresponding hubs 20a and 20b on the left side of the strollers 1a and 1b respectively to join the strollers. As would be well understood by those of skill in the art, the strollers 1a or 1b can be any commercially available or new stroller that comprises the primary connecting mechanism 45 which can be either permanently or releaseably attached to each stroller 1a or 1b via connecting mechanism 45. In one exemplary embodiment the hubs 10a, 10b, 20a, and 20b are semi-permanently attached respectively to Frame tubes 29a, 29b, 33a, and 33b forming part of the frames of the strollers 1a and 1b by screw or rivet. Of course, as would be well understood by those of skill in the art, any permanent, semi-permanent, or non-permanent attaching methods and mechanisms for attaching the hubs to the strollers are within the scope of the present invention including but not limited to the use of clamps, straps, quick-release pin joints, bayonet connections, and the like.

In one exemplary embodiment, the primary connecting mechanism 45 comprises hubs 10a and 20b located generally at the center of the sides of the stroller 1a and 1b. Hub 10a of stroller 1a, comprises a male raised dovetail male joint 32a and hub 20b of stroller 1b comprises a corresponding female receiving feature 31b which receives raised dovetail male portion 32a. Of course, in an exemplary embodiment of the present invention, each stroller 1a and 1b comprises both hub 10a on the right-side and hub 20b on the left side. In alternate embodiments, the hub type can be switched so that hub 10a is on the left-side and hub 20b is on the right side. In one exemplary embodiment, the female joint feature 31b comprises a tapered dovetail wedging connection that is engaged by rolling stroller 1a up alongside stroller 1b so that raised dovetail male joint feature 32a is aligned with and inserted into receiving feature 31b. A generous lead-in effect allows easy aiming to facilitate the connection. The tapered nature of protruding joint feature 32a causes it to become releasably connected as it is inserted into receiving feature 31b. In one exemplary embodiment, it is expected that the general direction of movement allowed by each stroller individually when so joined is for the right stroller 1b to move to the rear relative to the left stroller 1a. Moreover, due to the dovetail nature of the connection mechanism 45, resistance is provided to some rotational degrees of freedom.

Other methods of releasably connecting hub 10a to hub 20b are, of course, within the scope of the present invention as would be well understood by those of skill in the art including but not limited to pin and socket connections, ball and socket joints, pin joints with retractable ball locks, twist locks such as BNC electrical connectors, magnets, and the like.

For example, in yet another embodiment of the present invention, the primary connecting mechanism 45 comprises hubs 10a and 20b rotated at an angle so that the dovetail point of the joint is displaced and is no longer parallel to the ground. In order to engage the primary connecting mechanism 45, the user has to lift the stroller and position and drop the hub 20b of stroller 1b in place over hub 10a of stroller 1a.

In an alternate embodiment, the user lifts up the back wheels 19b and 21b to engage hub 20b to hub 10a. In this alternate embodiment, the weight of the stroller 1b and the child helps keep the primary connecting mechanism 45 engaged.

Depending on the shape and configuration of the stroller itself, the primary connecting mechanism 45 can be moved to a position that would provide a stronger and more stable multi-seat stroller. For example, as shown in FIG. 3B, in an exemplary embodiment of the present invention, the primary connecting mechanism 645 is integrated into the back of the stroller rear support rods 630a and 630b. Specifically, hubs 610 and 620 of primary connecting mechanism 645 are connected behind rear support rods 630a and 630b respectively. Integrating hubs 610 and 620 into their respective stroller rear support rods 630a and 630b as well as relocating each hub to this position behind the back of the stroller chair 650, increases the strength of the connection in this and similar stroller arrangements.

Figure 3A:
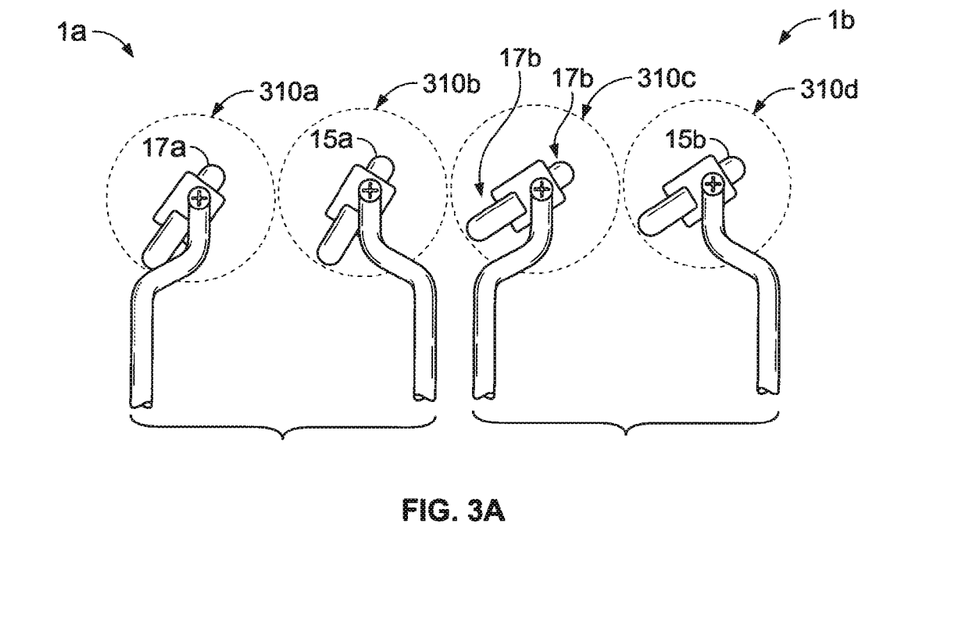
FIG. 3A is an overhead view of the inventive stroller front wheel alignment showing that the wheels can rotate without interfering with each other in accordance with an exemplary embodiment of the present invention.
Figure 3B:
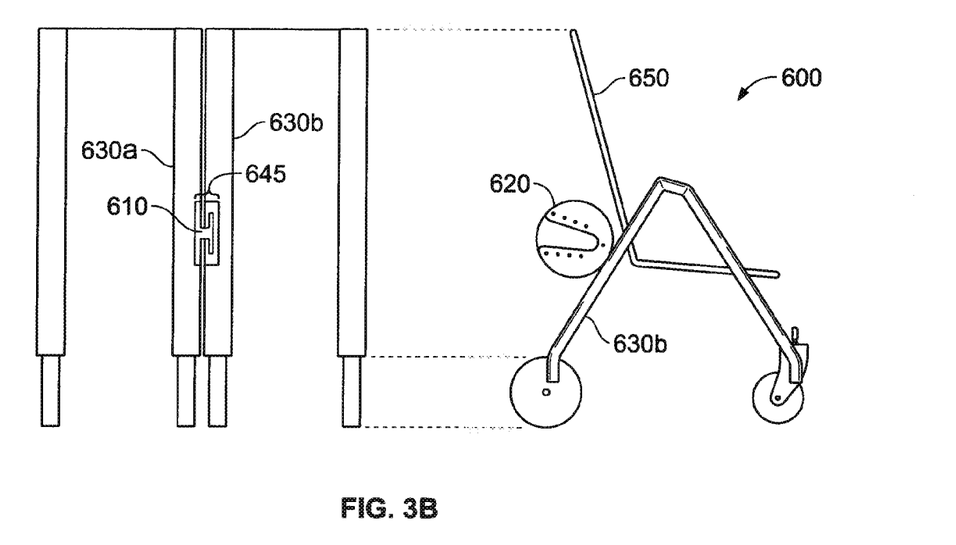
FIG. 3B is a schematic view of the inventive stroller showing the joining of two of the inventive strollers with the primary locking mechanism displaced in accordance with an exemplary embodiment of the present invention.
Figure 3C:
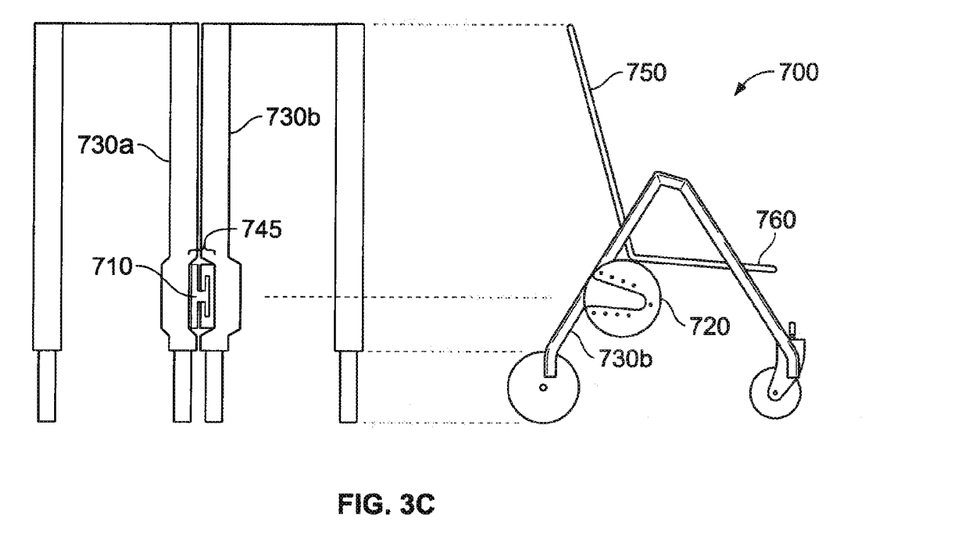
FIG. 3C is a schematic view of the inventive stroller showing the joining of two of the inventive strollers with the primary locking mechanism displaced in accordance with another exemplary embodiment of the present invention.

In another exemplary embodiment shown in FIG. 3C, the primary connecting mechanism 745 is integrated into the back of stroller rear support rods 730a and 730b and placed in front of rear support rods 730a and 730b and underneath the back portion of seat 760 of stroller chair 750. Specifically, hubs 710 and 720 of primary connecting mechanism 745 are connected in front of rear support rods 730a and 730b respectively and underneath the back of the seat portion of stroller chair 760. Integrating hubs 710 and 720 with their respective stroller rear support rods 730a and 730b as well as relocating each hub to this position underneath the back of the seat 760 of stroller chair 750, increases the strength of the connection in this and similar stroller arrangements. As would be well understood by those of skill in the art the present invention contemplates placing the primary connecting mechanism in any location with respect to the stroller.

As there can be significant torque applied to the primary connecting mechanism 45 created by a user pushing on handlebars 52a and 52b, a second exemplary embodiment contemplated by the present invention comprises a secondary connecting mechanism 62 disposed near the top of vertical members 72a and 72b, which are tabular in preferred embodiments, forming handles 52a and 52b of the strollers 1a and 1b respectively. This secondary connecting mechanism 65 further prevents the primary connection 45 from disengaging. In this exemplary embodiment, the secondary connecting mechanism 62 comprises a pin 40b and socket 30a joint where the axis of this secondary connecting mechanism 62 is parallel to rear axle 64a or 64b respectively of stroller 1a or 1b.

Socket 30a comprises a catch, or latch, that engages when the pin 40b is inserted fully into the socket 30a. A release button 66a disengages the catch to allow the strollers 1a and 1b to be disconnected. Secondary connecting mechanism 62 essentially locks the two handles 52a and 52b together, preventing some or all relative translation. Of course, it will be understood by those of skill in the art that other methods of releasably connecting stroller 1a and stroller 1b at a location near the top of vertical members 72a and 72b are within the scope of the present invention as would be understood by those of skill in the art including but not limited to ball and socket joints, pin joints with retractable ball locks, twist locks such as BNC electrical connectors, magnets, and the like.

In yet another exemplary embodiment of the present invention, third or even fourth connection points 53 can be included. As shown in FIG. 1, in this embodiment, connection points 50a, 60b and 51a, 61b are disposed in the front of and behind of the primary connecting mechanism 45, namely on the armrest 80a and 80b respectively. These additional connection points 50a, 60b, and 51a, 61b can further stabilize the joined strollers 1a and 1b, particularly when traversing uneven ground. Connection points 50a, 60b and 51a, 61b can, in this embodiment, be semi-permanently attached connection points such as pin and socket joints or the like. Alternatively, these connection point 50a, 60b and 51a, 61b can be merely frictional contact points that touch when the strollers 1a and 1b are engaged and help keep the strollers 1a and 1b aligned, diminishing some of the effects of torque generated when the strollers are pushed by a user. For instance, in one exemplary embodiment, 50a and 51a may protrude slightly to fit into sockets 60b and 61b respectively when the strollers 1a and 1b are engaged. Of course, it will be understood by those of skill in the art that adding more of the inventive connection points or connecting mechanisms described herein and also adding them onto different areas of the stroller frame or to other parts of the strollers fall within the scope of the present invention.

As would be well understood by those of skill in the art, the invention contemplates manufacturing strollers integrated with either permanently attached, semi-permanently attached, non-permanently attached or releasably attached connecting mechanisms 45, 62, and 53 and also contemplates manufacturing and selling only the connecting mechanisms 45, 62, and 53 that can be attached to any stroller either permanently or releasably, either all together or individually. Of course, as would be well understood by those of skill in the art, any permanent, semi-permanent, or non-permanent attaching methods and mechanisms for attaching the connecting mechanisms 45, 62, and 53 to the strollers fall within the scope of the present invention including but not limited to the use of screws, rivets, clamps, straps, quick-release pin joints, bayonet connections, and the like.

Figure 2:
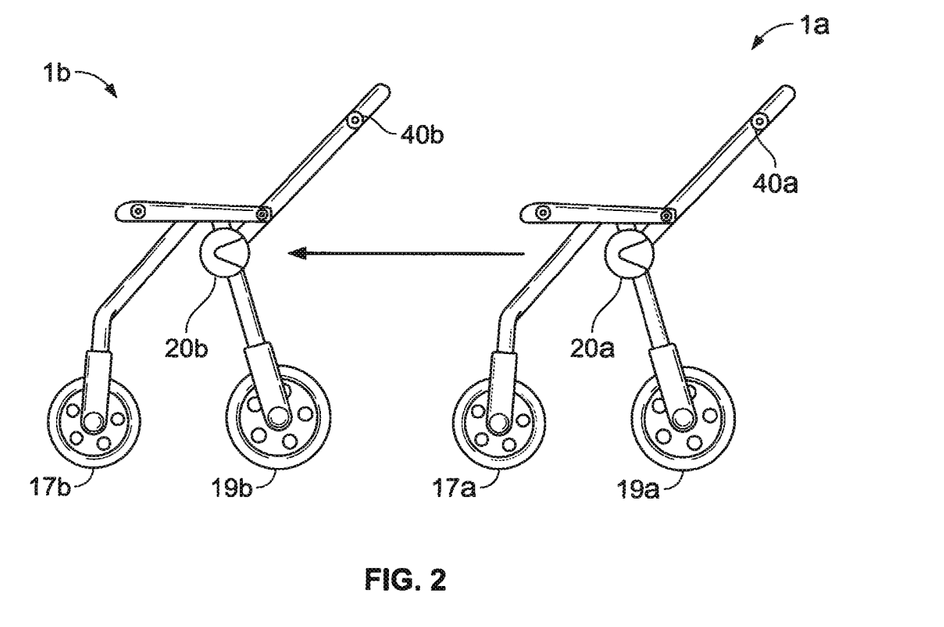
FIG. 2 is a schematic side view illustrating the joining of two of the inventive strollers in accordance with an exemplary embodiment of the present invention.

FIG. 2 is a schematic side view illustrating the mating of the primary and secondary connecting mechanism 45 and 62 to join two of the inventive strollers 1a and 1b in accordance with an exemplary embodiment of the present invention. As shown in FIG. 1 and FIG. 2 in order to join the strollers 1a and 1b together and join the primary connecting mechanism 45, a user merely has to align hub 10a into hub 20b so that raised male joint feature 32a mates with the matching female receiving feature 31b. The lead-in effect of the primary connecting mechanism 45 further makes it easy and convenient for a user to connect strollers 1a and 1b. In this exemplary embodiment, the lead-in is accomplished by forming the male and female parts of the joints in a tapered but complementary fashion. As a result, when the two halves of the joint first begin to engage, the enlarged end of the female portion is encountering the narrowed end of the male portion. The difference in these dimensions allows the engagement to occur despite any misalignment that is smaller in magnitude than the difference in size of the narrow end of the male portion and the wide end of the female portion. Because the male and female shapes are complementary, as the tapered shapes slide into each other the misalignment will be removed once full engagement has occurred. Longer lengths of engagement and larger tapered angles will result in more tolerance of misalignment. Forms of such joints that include but are not limited to tapered dovetail joints, a cone-shaped interface and the like. In another exemplary embodiment, the secondary connecting mechanism 62 is engaged by pushing the handlebars of each stroller 1a and 1b together to snap pin 40b into socket 30a. Of course, it will be understood by those of skill in the art, that more than two strollers can be connected and that a user can connect as many of the inventive strollers as desired.

FIG. 3A is an overhead view of the inventive stroller front wheel alignment showing that wheels 17a, 15a, 17b, and 15b are positioned to rotate without interfering with each other in accordance with an exemplary embodiment of the present invention. In an exemplary embodiment of the invention, the primary connecting mechanism 45 is positioned to afford sufficient distance between the strollers 1a and 1b when joined such that the front wheels 15a and 17b will not interfere with each other. As shown in FIG. 3A, wheel 17b does not enter interference zone 310b of wheel 15a and wheel 15a does not enter interference zone 310c of wheel 17b. Of course, it will be understood by those of ordinary skill in the art that the distance between the wheels 15a and 17b can be any desired distance that allows the wheels not to interfere with each other and not just the minimal distance to prevent interference. In yet another exemplary embodiment, when the strollers are joined, the wheel of the first stroller having the larger interference zone on the side to be connected (whether the front wheel or the back wheel) will be placed (when the stroller is connected by the primary connecting mechanism 45) at a sufficient distance from its corresponding wheel on the second stroller so that neither wheel enters the interference zone of the other.

In an alternate embodiment, the wheels 15a and 17b or 21a and 19b can overlap into each others interference zones if the wheels can be caused to steer substantially identically by some mechanism.

Figure 4:
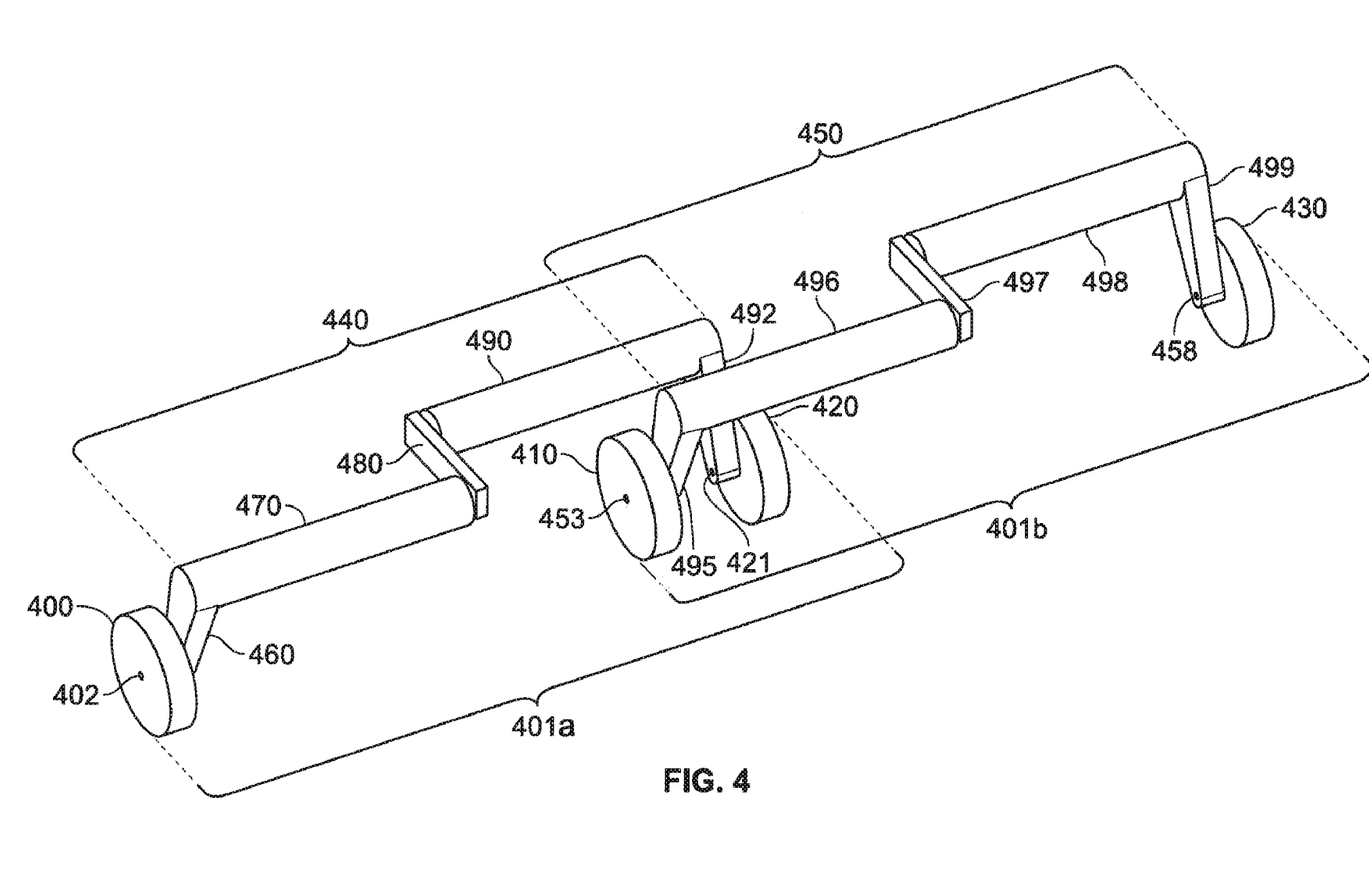
FIG. 4 is an illustrative view of the inventive stroller wheel alignment showing interlocking frames in accordance with an exemplary embodiment of the present invention.

FIG. 4 is an illustrative view of the inventive stroller illustrating an interlocking frame arrangement in accordance with an exemplary embodiment of the present invention. In this embodiment, the rear wheel S-frames 440 and 450 are arranged so that wheels 400, 410, 420, and 430 interlock upon adjoining a stroller to the side where the respective wheel is located thereby providing more stability to the resulting multi-seat stroller. Furthermore, this arrangement would allow for a single stroller to be wider and therefore more stable as a single stroller as well, thus stability is maximized as a single stroller that is also capable of being connected to another stroller as a multi-seat stroller.

In a preferred embodiment, the interlocking frames are accomplished by supporting rear wheels 400, 410, 420, and 430 asymmetrically, thereby avoiding the need for a solid axle. Wheels 400, 410, 420, and 430 are cantilevered and supports 460, 495, 492, and 499 are arranged so as to not interfere with each other.

In a preferred embodiment of the interlocking frame arrangement 401a, a first S-frame 440 comprises a proximal support 460 that is connected to hub 402 of wheel 400 at one end and proximal frame portion 470 at the other end. Proximal frame portion 470 is then connected to S-linking support 480 at the other end and S-linking support 480 is then connected to distal frame portion 490 at the other end. Distal frame portion 490 is then connected to distal support 492 at the other end which is connected to hub 421 of wheel 420. Thus, S-frame base 440 comprises a proximal support 460 that approaches hub 402 of wheel 400 from the rear thereby connecting S-frame 440 to wheel 400 at one end, and S-frame 440 has a distal support 492 that approaches hub 421 of wheel 420 from the front thereby connecting S-frame 440 to wheel 420.

As shown in FIG. 4, a second S-frame 450 comprises similar parts including a proximal support 495 that is connected to the hub 453 of wheel 410 at one end and proximal frame portion 496 at the other end. Proximal frame portion 496 is then connected to S-linking support 497 at the other end and S-linking support 497 is then connected to distal frame portion 498 at the other end. Distal frame portion 498 is then connected to distal support 499 at the other end which is connected to hub 458 of wheel 430. Thus, S-frame base 450 comprises a proximal support 495 that approaches hub 453 of wheel 410 from the rear thereby connecting S-frame 450 to wheel 410 at one end, and S-frame 450 has a distal support 499 that approaches the hub 458 of wheel 430 from the front thereby connecting S-frame 450 to wheel 430.

Figure 5:
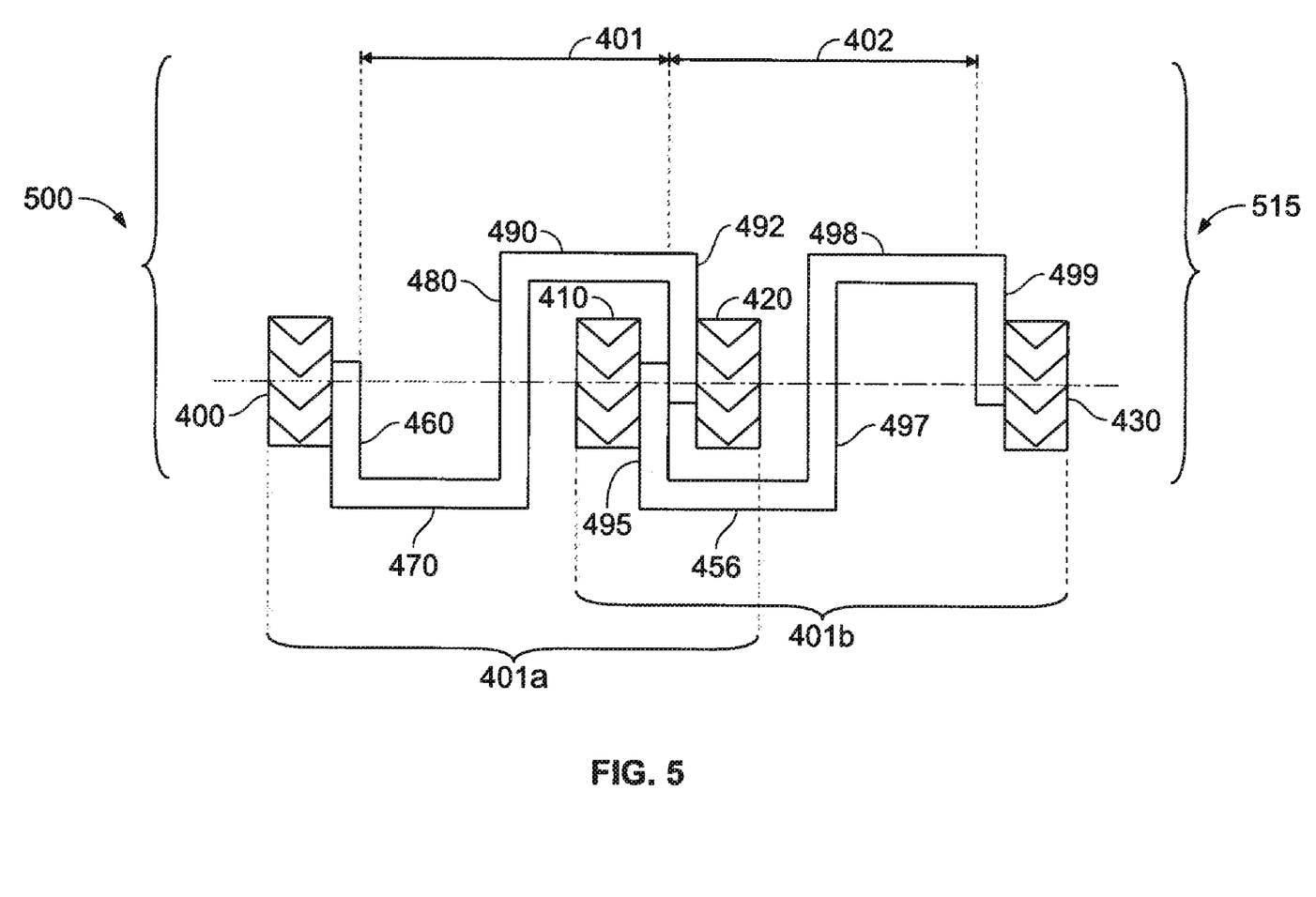
FIG. 5 is a dimensional view of the multi-seat stroller implementing the interlocking frame arrangement in accordance with an exemplary embodiment of the present invention.

FIG. 5 is a dimensional view of a multi-seat stroller implementing an interlocking frame arrangement in accordance with an exemplary embodiment of the present invention. In one exemplary embodiment, the width of each stroller chair 401, 402 is approximately 32.4 cm; the width of each stroller wheel 400, 410, 420, and 430 is approximately 3.8 cm; the width of each interlocking wheel base 401a and 401b is approximately 42.5 cm; the width of each proximal and distal support 460, 495, 492, and 499 is approximately 1.3 cm; each width portion from the other side of each proximal wheel 400 and 410 to the inside of each distal support 492 and 499 is approximately 37.5 cm; the total width of two strollers incorporating the interlocking frame arrangement is approximately 74.9 cm. If the width of each stroller wheel 400, 410, 420, and 430 is approximately 2.5 cm, then the width of each interlocking wheel base 401a and 401b is approximately 41.3 cm and the width of each stroller chair is approximately 33.7 cm. Both strollers 500 and 510 have an interlocking wheel base 401a and 401b approximately 5.1 cm wider than half the total width of the two strollers 500 and 515 joined together. In order to prevent any collision, both strollers 500 and 515 have a stroller chair width of approximately 5.1 cm less than half the total width of the two stroller 500 and 515 joined together. While various dimensions are described herein for the stroller with the interlocking frame arrangement, it will be well understood by those of skill in the art that the invention contemplates any and all dimensional choices one might select for the stroller.

As shown in FIGS. 4 and 5, in a preferred embodiment order to provide more support to the inventive stroller by connecting the interlocking frame arrangement, a user merely has to drive the left wheel 410 of the right stroller 515 to the left of the right wheel 420 of left stroller 500 and thus interlock the proximal support 495 of stroller 515 with distal support 492 of stroller 515. It will be understood by those of skill in the art, that more than two strollers can be connected and that a user can connect as many of the inventive strollers as desired. It will also be understood by those of skill in the art that the arrangement of each interlocking wheel base 401a and 401b can be reversed such that the S-frames 440 and 450 have the proximal supports 460 and 495 and proximal frame portions 470 and 496 towards the front and distal supports 492 and 499 and distal frame portions 490 and 498 towards the rear. In this exemplary embodiment, the user would drive right wheel 420 of left stroller 500 to the right of left wheel 410 of the right stroller 515 and thus interlock the proximal support 495 of stroller 515 with distal support 492 of stroller 515.

Figure 6:
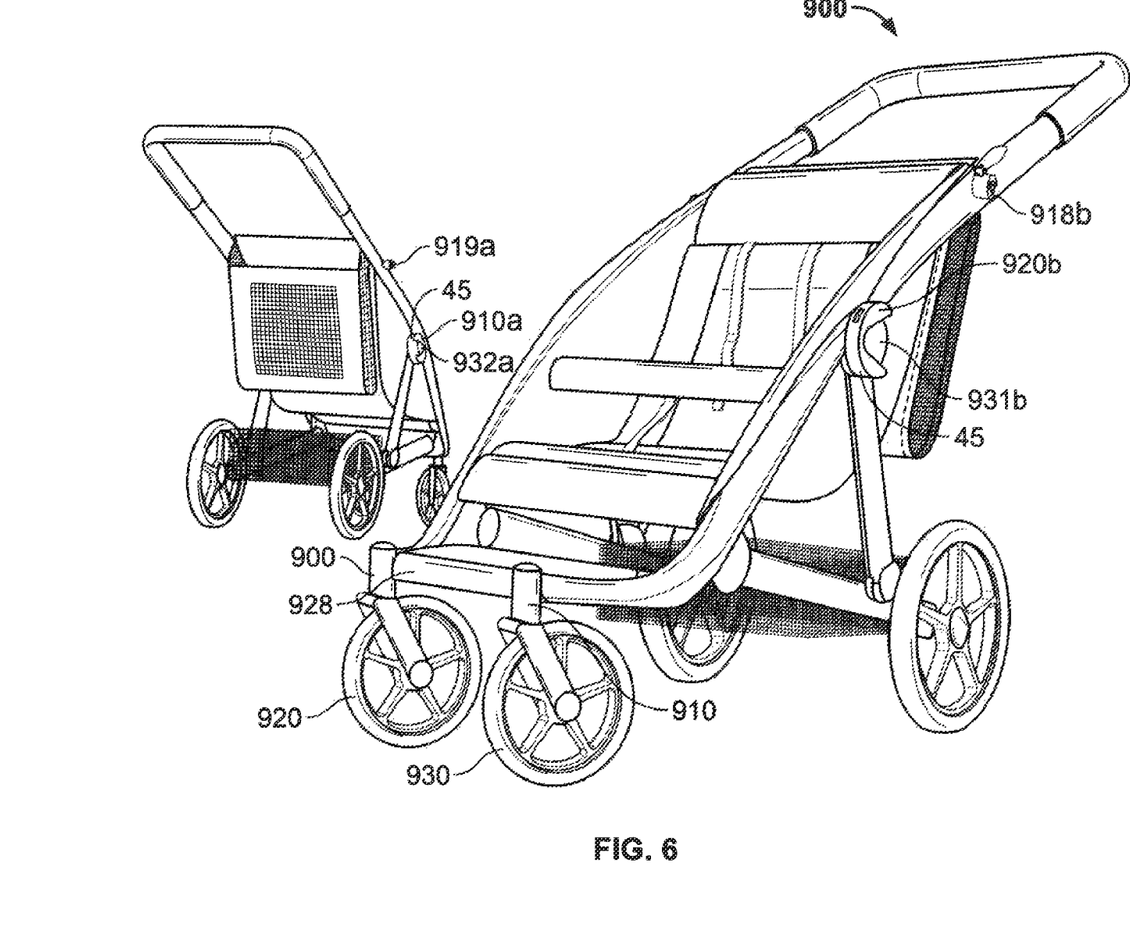
FIG. 6 is an illustrative view of an inventive stroller in accordance with an exemplary embodiment of the present invention showing the front, back and left and right sides of the stroller.

FIG. 6 is an illustrative view of an inventive stroller in accordance with an exemplary embodiment of the present invention showing the front, back and left and right sides of the stroller. In this embodiment front 928 of stroller 900 is tapered inwardly toward the center of stroller 900 and front wheel 920 and 930 are disposed on either side of the tapered front 928. Thus when stroller 900 is adjoined to another same stroller via connecting mechanism 45, wheel 920 and 930 will be able to rotate without interfering with the wheels of a second stroller that is connected to the stroller 900.

Figure 7:
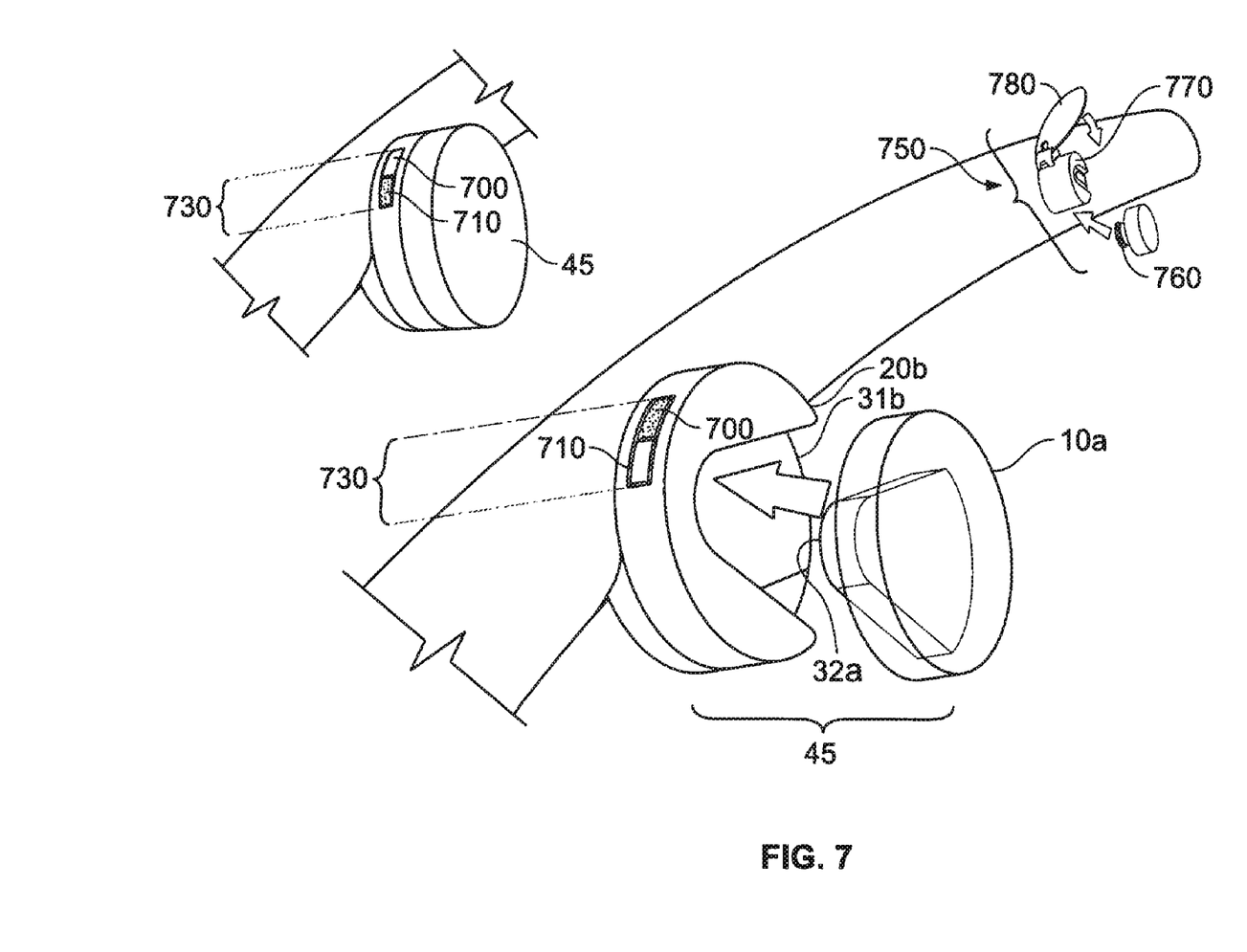
FIG. 7 is a close-up illustrative view of the inventive primary and secondary connecting mechanism according to an exemplary embodiment of the present invention.

FIG. 7 is a close-up illustrative view of the inventive primary and secondary connecting mechanism according to exemplary embodiments of the present invention. As shown in FIG. 7, the inventive primary connecting mechanism 45 can further comprise a lock sensor 730. Lock sensor 730 shows when hub 10a and 20b are sufficiently joined and when hub 10a and 20b are not sufficiently joined. FIG. 7 also shows an alternate embodiment for secondary connecting mechanism 750. Secondary connecting mechanism 750 in this embodiment comprises a peg 760 that is on a second stroller that can be slid into the peg catch 770. The peg catch 770 then releasably connects the peg 760 and the stroller 900 is further joined to a second stroller having the peg 760. The peg can be released by the depression of the peg release 780.

The previously described versions of the present invention have many advantages, including but not limited to a much more convenient stroller that affords users the flexibility of a single stroller along with the benefits of a multi-seat stroller. By providing a stroller that can be converted to a dual or multi-seat stroller, several advantages are realized including but not limited to allowing a childcare provider to transport multiple children at once, and allowing the childcare provider to separate the children if needed in order to go to two separate locations.

Although the present invention has been described in considerable detail with reference to certain versions thereof, other versions are possible. For example: the protruding and receiving parts of the primary connecting mechanism can be placed on either side of the stroller; the strollers can be attached to more than one other stroller; any of the contemplated connecting mechanisms can either be permanently attached to the strollers or alternatively can be sold separately and attached to any stroller; the strollers can use some or all of the iterated connecting mechanisms; a braking mechanism can be added such that when the strollers are engaged, one braking mechanism is created so that the user can stop the connected stroller by operating only one mechanism instead of having to brake each stroller separately; as would be well understood by those of skill in the art, the connecting mechanisms can be joined in any way including but not limited to the use of a hinge, a clasp, a locking mechanism, a detente mechanism, chemically-based connecting means, magnets, ball and sockets, bayonet joints, quick-release pin joints, hooks, pull latches, buckles, straps, velcro and the like. Moreover, the inventive connecting mechanisms can be applied to any wheeled transportation device including wheelchairs, luggage carts, rolling luggage, shopping carts, pet strollers, and the like. Any and all such embodiments and others as readily understood by those of skill in the art are contemplated by the present invention.

While the present invention has been particularly described with respect to the illustrated embodiment, it will be appreciated that various alternations, modifications and adaptations may be made based on the present disclosure, and are intended to be within the scope of the present invention. Therefore, the spirit and scope of the appended claims should not be limited to the description of the embodiments herein.

What is claimed:

1. A multi-seat stroller unit comprising:
   a first stroller comprising a first side and a second side wherein said first side comprises a first hub having a male protruding feature and said second side comprises a second hub having a female receiving feature;
   a second stroller comprising a first side and a second side wherein said first side comprises a first hub having a male protruding feature and said second side comprises a second hub having a female receiving feature wherein said second hub of said second stroller can be connected to said first hub of said first stroller by mating said male protruding feature of said first hub of said first stroller to said matching female receiving feature of said second hub of said second stroller thereby adjoining said first stroller to said second stroller,
   said multi-seat stroller unit further comprising an interlocking frame arrangement comprising:
   a first wheel base connected to said first stroller comprising:
   an S-frame comprising a proximal frame portion, a proximal support piece, a distal frame portion, a distal support piece, and an S-linking support piece wherein said proximal frame portion is connected to said proximal support piece at one end and connected to said distal support piece by said S-linking support piece at the other end and wherein said distal frame portion is connected to said distal support piece;
   a first wheel comprising a hub connected to said S-frame by said proximal support piece;
   a second wheel comprising a hub connected to said S-frame by said distal support piece; and
   a second wheel base connected to said second stroller comprising:
   an S-frame comprising a proximal frame portion, a proximal support piece, a distal frame portion, a distal support piece, and an S-linking support piece wherein said proximal frame portion is connected to said proximal support piece at one end and connected to said distal support piece by said S-linking support piece at the other end and wherein said distal frame portion is connected to said distal support piece;
   a first wheel comprising a hub connected to said S-frame by said proximal support piece;
   a second wheel comprising a hub connected to said S-frame by said distal support piece;
   wherein said second wheel of said first stroller and said first wheel of said second stroller can interlock by driving said first wheel of said second stroller to the inner side of said second wheel of said first stroller such that a portion of said distal support piece of said first stroller interfaces with a portion of said proximal support piece of said second stroller and a portion of said distal frame portion of said first stroller interfaces with a portion of said proximal frame portion of said second stroller thereby adjoining said first stroller and said second stroller.

2. The multi-seat stroller unit of claim 1 wherein said male protruding feature of said first hub of said first stroller and said female receiving feature of said second hub of said second stroller are tapered thereby establishing a tapered dovetail wedging connection when said male protruding feature of said first stroller is engaged with said female receiving feature of said second stroller.

3. The multi-seat stroller unit of claim 1 further comprising a secondary connecting mechanism disposed towards the top of said multi-seat stroller comprising:
   a first pin connected to an upper frame of said first side of said first stroller and a first socket connected to an upper frame of said second side of said first stroller; and
   a second pin connected to an upper frame of said first side of said second stroller approximately parallel to said first socket on said first stroller and a second socket connected to an upper frame of said second side of said second stroller approximately parallel to said first pin on said first stroller wherein said second socket can be releasably connected to said first pin on said first stroller by injecting said first pin of said first stroller into said second socket of said second stroller thereby adjoining said first stroller to said second stroller.

4. The multi-seat stroller unit of claim 1 wherein said first hub and second hub of said first stroller are releasably connected to said first stroller and wherein said first hub and second hub of said second stroller are releasably connected to said second stroller.

5. The multi-seat stroller unit of claim 3 wherein said first pin and first socket of said first stroller are releasably connected to said first stroller and said second pin and said second socket of said second stroller are releasably connected to said second stroller.

6. The multi-seat stroller unit of claim 1 wherein said first hub of said first stroller is disposed in a center and rear location of said first side of said first stroller and wherein said second hub of said first stroller is disposed in a center and rear location of said second side of said first stroller.

7. The multi-seat stroller unit of claim 1 wherein said first hub of said second stroller is disposed in a center and rear location of said first side of said second stroller and wherein said second hub of said second stroller is disposed in a center and rear location of said second side of said second stroller.

8. The multi-seat stroller unit of claim 1 wherein said first stroller comprises a seat comprising a back-support portion and seat-support portion and wherein said first hub of said first stroller is disposed behind and towards a bottom of said back-support portion and above and behind said seat-support portion of said first side of said stroller and wherein said second hub is disposed behind and towards a bottom of said back-support portion and above and behind said seat-support portion of said second side of said first stroller.

9. The multi-seat stroller unit of claim 1 wherein said second stroller comprises a seat comprising a back-support portion and a seat-support portion and wherein said first hub of said second stroller is disposed behind and towards a bottom of said back-support portion and above and behind said seat-support portion of said first side of said second stroller and wherein said second hub is disposed behind and towards a bottom of said back-support portion and above and behind said seat-support portion of said second side of said second stroller.

10. The multi-seat stroller unit of claim 1 wherein said first stroller comprises a seat comprising a back-support portion and a seat-support portion and wherein said first hub of said first stroller is disposed underneath and toward the rear of said seat-support portion of said first side of said first stroller and wherein said second hub is disposed underneath and toward the rear of said seat-support portion of said second side of said first stroller.

11. The multi-seat stroller unit of claim 1 wherein said second stroller comprises a seat comprising a back-support portion and a seat-support portion and wherein said first hub of said second stroller is disposed underneath and toward the rear of said seat-support portion of said first side of said second stroller and wherein said second hub is disposed underneath and toward the rear of said seat-support portion of said second side of said second stroller.

* * * * *